United States Patent Office 3,182,786
Patented May 11, 1965

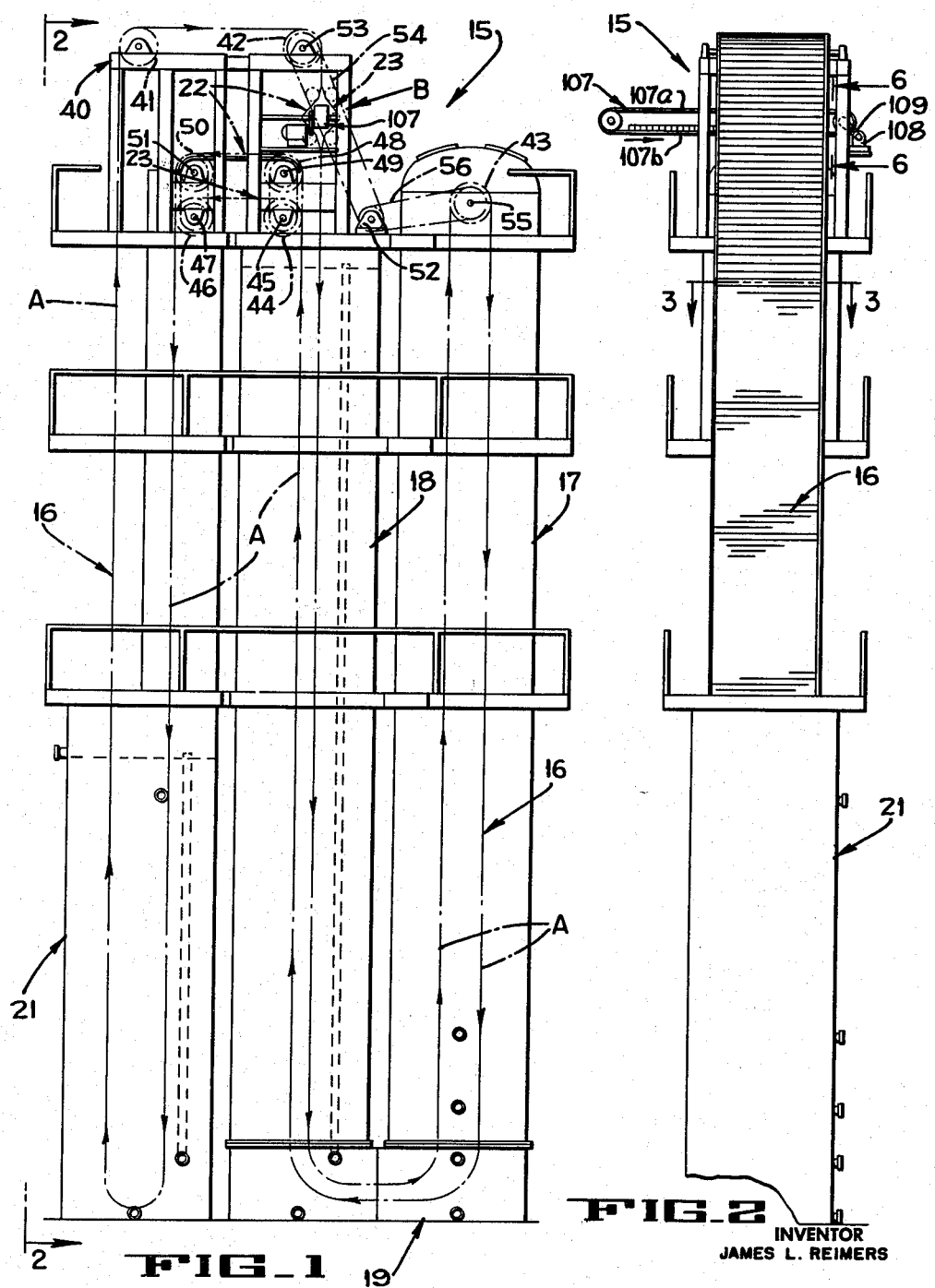

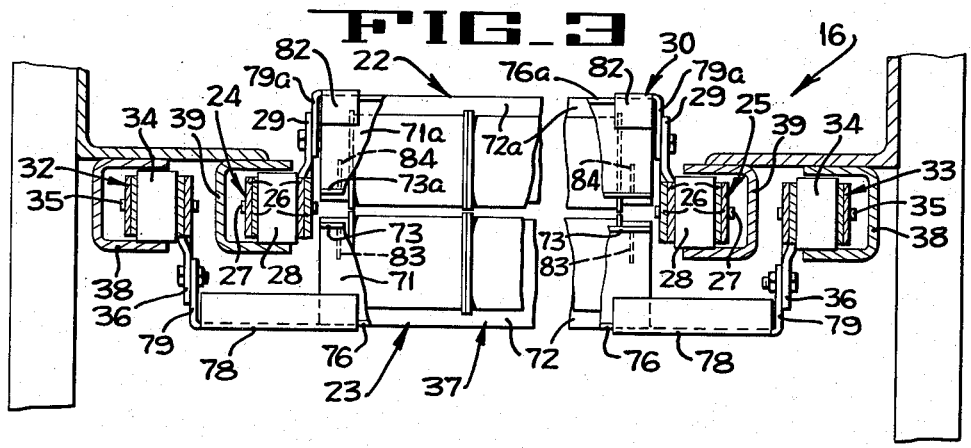
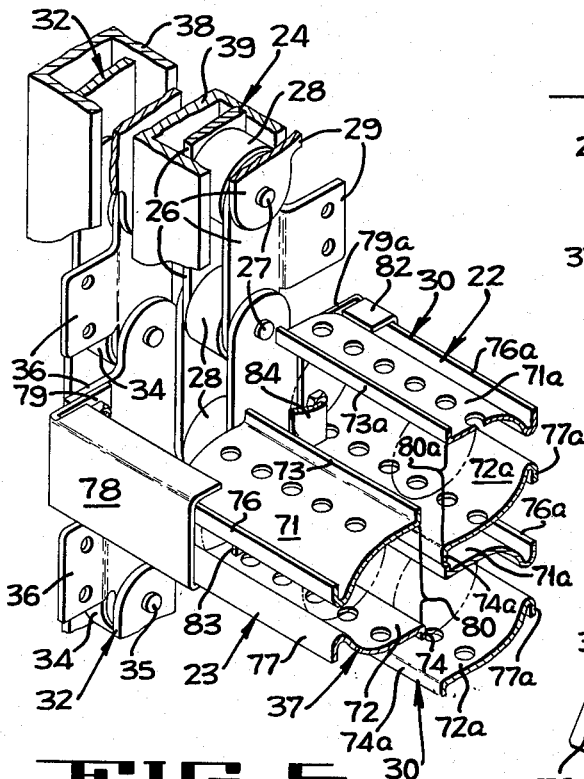
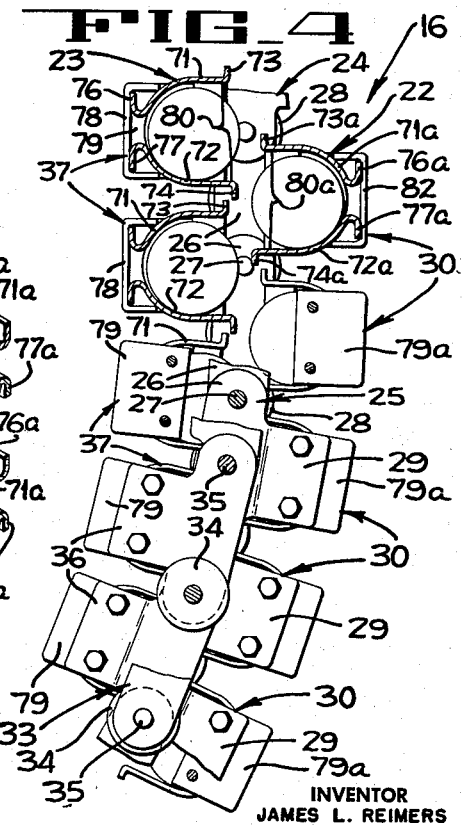

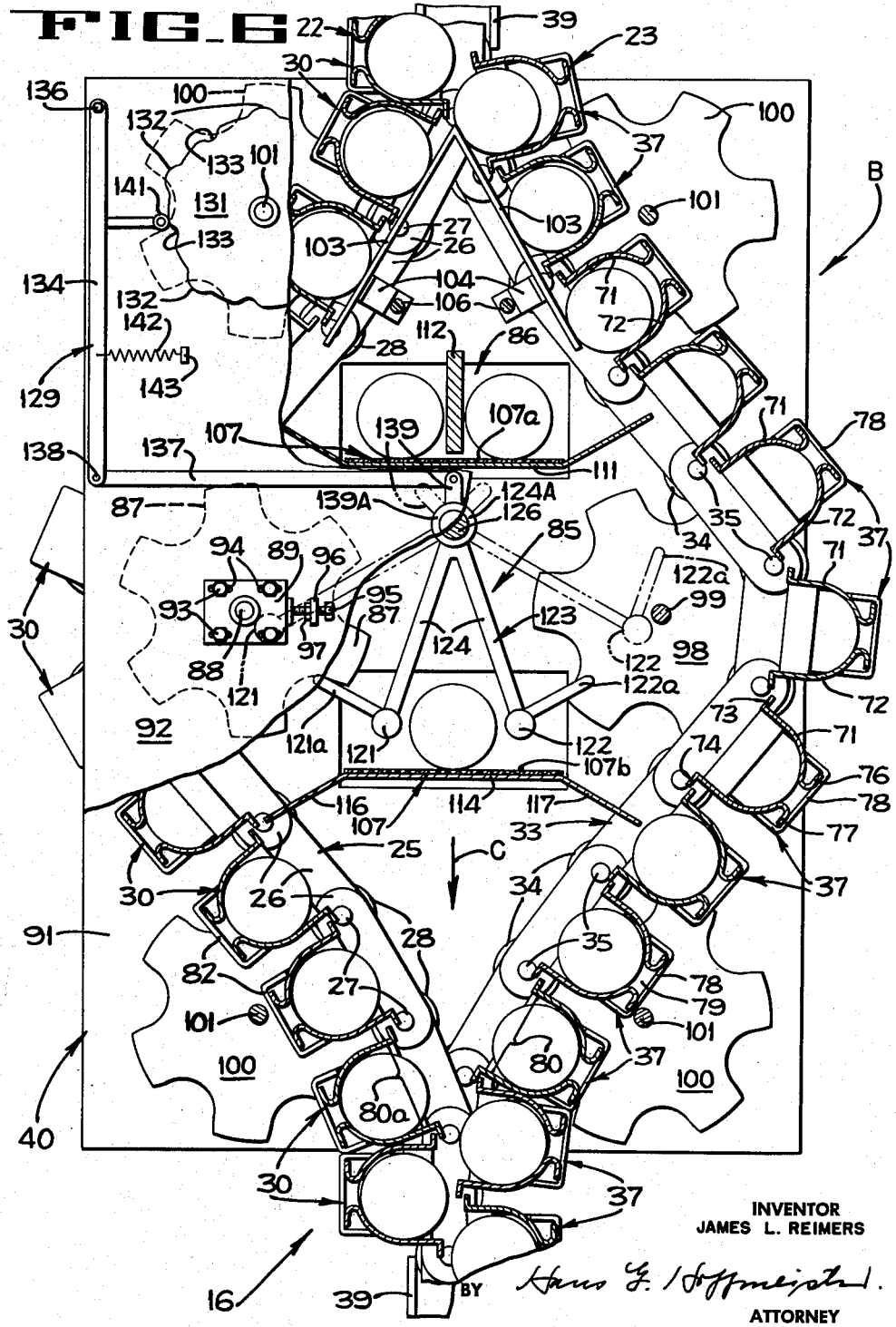

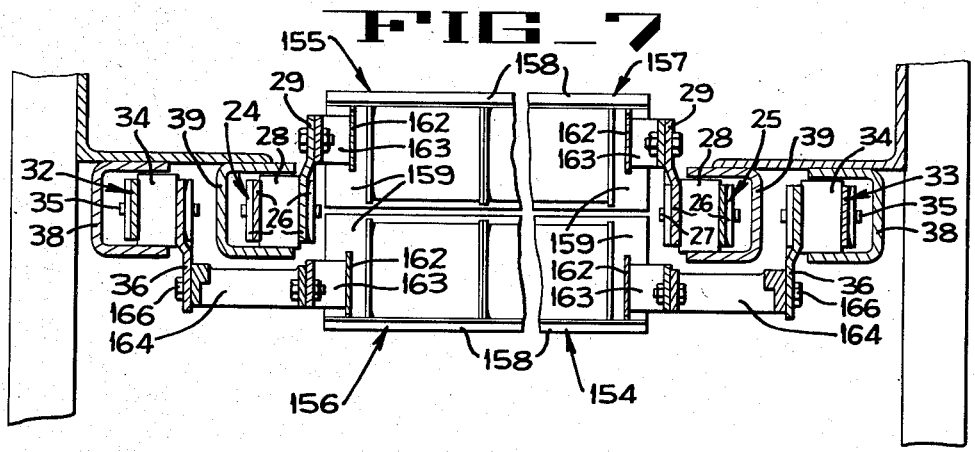
FIG_7
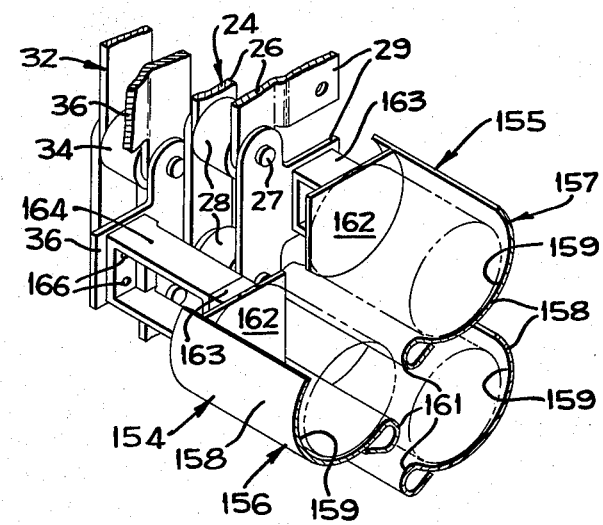
FIG_8
INVENTOR
JAMES L. REIMERS
BY Hans G. Hoffmeister
ATTORNEY

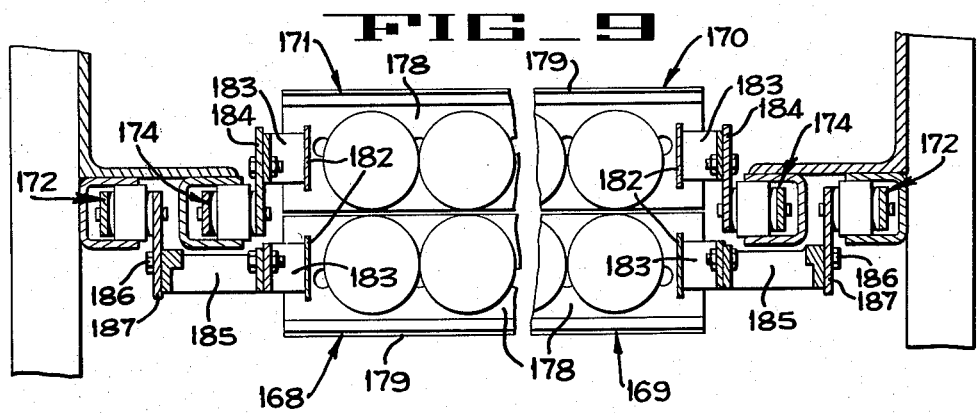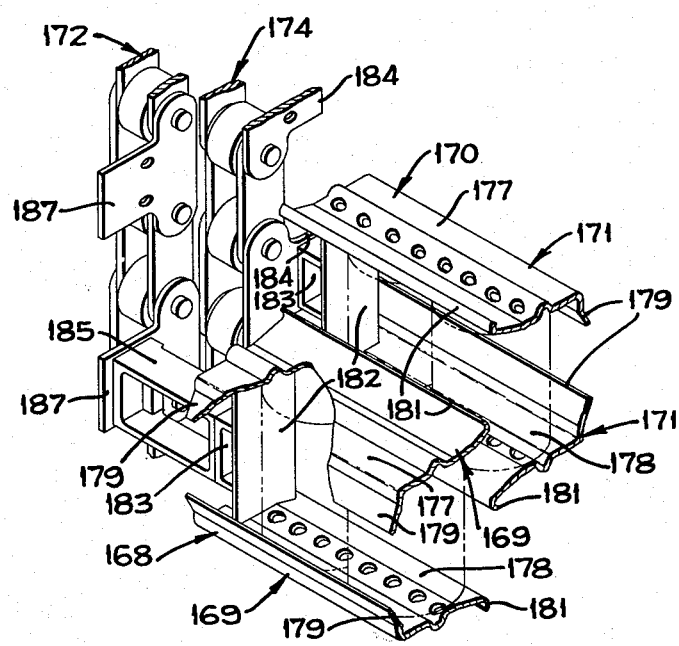

3,182,786
CONVEYING SYSTEM
James L. Reimers, San Jose, Calif., assignor to FMC Corporation, San Jose, Calif., a corporation of California
Filed May 3, 1963, Ser. No. 277,808
18 Claims. (Cl. 198—131)

The present invention pertains to conveying systems and more particularly relates to a conveying system for moving articles such as containers through hydrostatic cookers or the like.

Hydrostatic cookers having a single endless conveyor for advancing double rows of containers through the different processing chambers of the hydrostatic cooker are well known in the art. This double row type of conveyor has been recognized as being a very efficient structure for advancing a large number of containers through the several chambers of the cooker. Heretofore, the desirability of such double row conveyors has been somewhat reduced because the range of container sizes which this type of cooker could handle has been quite limited since the two rows of containers must be positively constrained between container supporting elements that flex relative to each other when moving around curves in the tortuous path taken by the conveyor during its travel through the cooker. Also, it has been difficult to feed containers to and discharge containers from certain known types of double row conveyors without the aid of expensive feeding and discharging equipment.

In accordance with the present invention, it has been discovered that the use of two conveyors, rather than one conveyor, for advancing double rows of containers through the hydrostatic cooker provides a conveying system which will positively constrain containers which vary considerably in size. Also, rows of containers are very easily fed into or discharged from the carriers of the double chain conveying system of the present invention.

Also, the carriers on the two conveyors of the present invention, have feed and discharge openings which are unobstructed by flanges, or the like, thereby permitting free rolling or sliding of the containers into or out of the carriers. The openings on the carriers on one conveyor are positioned to face the openings on the carriers on the other conveyor and are held immediately adjacent each other during a major portion of their travel through the cooker so that the surfaces which define the openings cooperate to constrain containers, or rows of containers, within their respective carriers as the carriers are moved through the cooker. With this arrangement, a wide variety of container sizes may be handled by the carriers without any danger of the containers being inadvertently released from their carriers while travelling through the cooker.

In order to feed containers into the carriers and to discharge containers from the carriers, the two conveyors are merely bowed outwardly from each other at a common feed and discharge station so as to space the carriers on one conveyor from those on the other conveyor. Containers which have been processed are then free to gravitate out of the unobstructed openings of the carriers on both conveyors onto a discharge apparatus which removes the containers from the area between the bowed portions of the conveyors. Containers to be processed are moved within the space defined by the bowed portion of the conveyor and are then deflected into the open carriers on both conveyors by a feed mechanism to be described hereinafter.

Accordingly, it is one object of the present invention to provide ta conveying system which utilizes a pair of cooperating conveyors for positively constraining containers, which may vary considerably in size, within carriers on the conveyors.

Another object is to provide an improved conveying system for handling articles.

Another object is to provide apparatus for feeding articles to and discharging articles from carriers of a double chain conveying system.

Another object is to provide means for easily changing the alignment of carriers on one conveyor of a double chain conveying system relative to the carriers on the other conveyor of the system.

These and other objects and advantages of the present invention will become apparent from the following description and the accompanying drawings, in which:

FIGURE 1 is a schematic side elevation of a hydrostatic cooker having the conveying system of the present invention associated therewith.

FIGURE 2 is a schematic end elevation of the apparatus of FIGURE 1 looking in the direction of lines 2—2 in FIG. 1.

FIGURE 3 is an enlarged fragmentary horizontal section taken along lines 3—3 of FIG. 2, certain parts being broken away.

FIGURE 4 is a vertical elevation of a portion of the double chain conveying system showing the conveyors moving around a curved path, certain parts being shown in section.

FIGURE 5 is an enlarged perspective of a portion of one end of the double chain conveyor system of FIGS. 3 and 4, certain parts being cut away and other parts being shown in section.

FIGURE 6 is an enlarged end elevation looking in the direction of lines 6—6 of FIG. 2 showing the mechanisms for feeding and discharging containers into the carriers of the double chain conveying system, certain parts being broken away and other parts shown in section.

FIGURE 7 is a horizontal section similar to FIG. 3 showing a modified embodiment of the carriers of the double chain conveying system of the present invention, said carriers being adapted to support containers on their sides.

FIG. 8 is an enlarged perspective showing one end of the carriers of FIG. 7, certain parts being cut away and other parts being shown in section.

FIGURE 9 is a horizontal section similar to FIG. 3 of still another embodiment of the double chain conveyors of the present invention, said conveyors being adapted to support containers on their ends.

FIGURE 10 is an enlarged perspective of one end of the carriers shown in FIG. 9.

The hydrostatic cooker 15 (FIGS. 1 and 2) with which the double chain conveying system of the present invention is associated is of conventional, well known design. The hydrostatic cooker comprises a closed, steam filled cooker 17 which communicates with a water filled heating unit 18, through a conduit 19. A cooling unit 21 is filled with cold water and is disposed adjacent the heating unit 18.

A double chain conveying system 16 which is arranged to carry the cans through the machine, is made up of two separate endless chain conveyors 22 and 23 (FIG. 4) which move through the machine side by side, each conveyor comprising a pair of spaced chains between which a plurality of can carriers extend. As seen in FIG. 3, the conveyor 22 has two spaced chains 24 and 25 each of which is made up of a plurality of links 26 connected by pivot pins 27 in which rollers 28 are rotatably journalled. Alternate ones of the links 26 are of special configuration so that all the links will have arms 29 which are in a common plane and project outwardly to support can carriers 30 which will be described in detail presently.

The conveyor 23 comprises two spaced chains 32 and 33 which are spaced further from each other than are the chains 24 and 25 of conveyor 22. Since the conveyor 23 is, therefore, wider than conveyor 22, it will be referred to hereinafter as the wide conveyor, while conveyor 22 will be referred to as the narrow conveyor. The chains 32 and 33 of wide conveyor 23 carry rollers 34 on pivot pins 35 and are provided with special links having arms 36 which are all disposed in a common plane and are adapted to support can carriers 37.

It will be noted in FIG. 3 that the rollers 34 of wide conveyor 23 and the rollers 28 of narrow conveyor 22 are in planar but not axial alignment, the rollers 34 being disposed in fixed guide tracks 38 and the rollers 28 being disposed in fixed guide tracks 39. Accordingly, the conveyors 22 and 23 are carried along a path shown by center lines in FIG. 1 and indicated by reference letter A.

Referring to the top of FIG. 1, the conveyors 22 and 23 are trained over four axially aligned rotatable sprockets 41 which are mounted in a superstructure 40. While only one sprocket is indicated, it will be evident that there is one sprocket 41 provided for each of the two chains 24 and 25 of the narrow conveyor 22 and one sprocket for each of the two chains 32 and 33 of the wide conveyor 23. After passing over the four sprockets 41, the conveyors are trained around four axially aligned sprockets 42 (one only being shown), and are directed downwardly through a loading and discharge zone B where the conveyors are temporarily separated. The apparatus associated with the conveyors in zone B will be described in detail hereinafter. After leaving zone B, the conveyors 22 and 23 move down through the heating unit 18, through conduit 19, and upwardly through the cooker 17. At the upper end of the cooker, the conveyors are trained over four aligned sprockets 43 (one only being shown) and then travel downwardly through the cooker, laterally through the conduit 19, and upwardly through the heating unit 18.

At a point above the heating unit, the two conveyors 22 and 23 are separated, the wide conveyor 23 being trained around a pair of aligned rotatable sprockets 44 on a shaft 45 and around a pair of aligned rotatable sprockets 46 on a shaft 47, and the narrow conveyor 22 being trained around a pair of rotatable sprockets 48 on a shaft 49 and around a pair of rotatable sprockets 50 on a shaft 51. The conveyors 22 and 23 are again brought to a side-by-side position and are moved downwardly and then upwardly through the cooling unit 21 to return to the sprockets 41. A motor 52 drives a shaft 53 on which the sprockets 42 are keyed through a chain drive 54, and drives a shaft 55 on which the sprockets 43 are keyed through a chain drive 56. As mentioned previously, there are four of the sprockets 41, two sprockets associated with the conveyor 22 and two sprockets associated with the conveyor 23. The teeth of the sprockets associated with conveyor 22 are not aligned axially of the sprockets with the teeth of the sprockets associated with conveyor 23 but are offset by a distance equal to one-half the pitch of the chains trained over the sprockets. Accordingly, the links of the wide conveyor 23 are out of phase with the links of the narrow conveyor 22.

The carriers 37 on the wide conveyor 23 extend between and are connected, as by bolts, to the support arms 36 projecting outwardly from the pair of roller chains 32 and 33 of the wide conveyor 23. The carriers 37 are all identical and each comprises a pair of curved side plates 71 and 72 having inner flanged edges 73 and 74, respectively, and outer flanged edges 76 and 77, respectively. The curved side plates 71 and 72 of each carrier are rigidly held in spaced relation from each other, to define a generally U-shaped carrier, by channel mounting members 78 welded to the flanges 76 and 77, said channels having inwardly bent tabs 79 which are bolted to respective ones of the carrier supporting arms 36. As clearly shown in FIG. 4, the curved side plate 71 is slightly shorter than the curved side plates 72 in transverse dimension thereby permitting the two conveyors 22 and 23 to move around curves without interference between the flanges 73 and 74 of adjacent carriers. A feed and discharge opening 80 is defined between two adjacent inner surfaces of the walls 71 and 72.

The carriers 30 of the narrow conveyor 22 are connected as by bolts to horizontally aligned carrier support arms 29 of the roller chains 24 and 25 associated with the narrow conveyor 22. The carriers 30 are identical to the carriers 37 with the exception that they are positioned so that their container receiving and discharging openings 80a are facing and disposed immediately adjacent the openings 80 of the carriers 37. Also, the carriers 30 have channel mounting members 82 which are shorter than the corresponding members 78 of the carriers 37. Since all other parts of the carriers 30 are identical to those of the carrier 37, these parts will not be described in detail but will be identified by the same numerals, used in describing the carrier 37, followed by the suffix "a." End straps 83 and 84 are welded to the end portions of the carriers 37 and 30, respectively, and serve as abutments to prevent the containers from moving out of the otherwise open ends of the carriers.

As clearly shown in FIGS. 3 and 5, the pairs of U-shaped tracks 38 and 39 guide the carriers 37 and the carriers 30 along paths which are immediately adjacent to each other so that the feed and discharge openings 80 in the carriers 37 are blocked by the flanges 73a and 74a of the carriers 30, and so that the feed and discharge openings 80a of the carriers 30 are blocked by the flanges 73 and 74 of the carriers 37. In this way, the inner flanges of the carriers on one of the conveyors cooperate with the carriers on the other conveyor to retain containers, which may vary considerably in size, therein. Thus, when the conveyors 22 and 23 are held together by the tracks 38 and 39, the conveyors 22 and 23 may be moved along a tortuous path through the hydrostatic cooker 15 without loss of containers from the carriers. This portion of the guide track system wherein the conveyors (and their associated paths of travel) are adjacent, shown generally by arrows A in FIG. 1, will be called the major portion.

In order to feed containers into the carriers or discharge containers from the carriers at zone B, the two conveyors 22 and 23 are merely bowed outwardly away from each other as indicated in FIG. 6, and a feed mechanism 85 and a discharge mechanism 86 are disposed within the bowed portions of the conveyors. This portion of the guide system wherein the conveyors (and their associated paths of travel) are separated, shown by arrow B in FIGS. 1 and 6, will be called the minor portion.

The narrow conveyor 22 is bowed outwardly by a pair of sprockets 87 (one only being shown) which are keyed to a shaft 88 which is journalled in bearings 89 (only one being shown) that are connected to end plates 91 and 92 of the superstructure 40 by bolts 93. The bolts 93 fit through horizontal slots 94 in the associated plates 91 or 92 so as to permit adjusting movement of the shaft 88 toward or away from the conveyor 23. Each bearing 89 is adjusted by means of a capscrew 95 which is threaded into an ear 96 projecting outwardly from the associated plate 91 or 92. The capscrew 95 engages a vertical abutment surface of the associate bearing 89. The bearings 89 are locked in adjusted position by a lock nut 97 and by tightening of the bolts 93.

The wide conveyor 23 is similarly bowed outwardly by a pair of axially aligned sprockets 98 (only one being shown) which are mounted on a shaft 99 which is journalled in bearings which are not shown but are identical to the bearings 89 associated with the shaft 88. The shaft 99 is mounted for horizontal adjustment in a manner similar to that of shaft 88.

In order to control the angle at which the conveyors 22 and 23 are bowed, and in order to relieve the transverse forces acting on the pairs of tracks 38 and 39 adjacent the bowed portions of the conveyors, a pair of idler sprockets 100 is keyed on each of four shafts 101, which are suitably journalled in the plates 91 and 92.

With the conveyors 22 and 23 moving downwardly in the direction of the arrow C shown in FIG. 6, the carriers with the processed containers therein move downwardly between the upper pairs of idler sprockets 100 at which time the two conveyors 22 and 23 begin to separate. The rows of containers are maintained within their carriers by means of a V-shaped baffle 103 which is suitably secured to the end plates 91 and 92 of superstructure 40 by means of brackets 104 and bolts 106. As the carriers and containers continue their downward movement the containers eventually roll off the lower end of the V-shaped baffle 103 and gravitate onto the upper run 107a of a transverse feed and discharge conveyor 107. It will be noted that the upper run 107a of the conveyor 107 alternately receives rows of containers from the carriers on the wide conveyor 23 and from the carriers on the narrow conveyor 22. The conveyor 107 is an endless belt type of conveyor and is driven by a motor 108 (FIG. 2) which is connected to the conveyor 107 by a chain drive 109.

In this way, the conveyors 22 and 23 alternately discharge rows of containers upon the upper run 107a of the transverse conveyor 107, which constitutes a part of the discharge mechanism 86, which conveyor is driven at a sufficient rate of speed to cause a row of containers discharged from one carrier to move out of zone B before another row of containers entering zone B is discharged from the next carrier. As shown in FIG. 6, the upper run 107a of the conveyor 107 is supported by a U-shaped guide 111 which serves to guide the rows of containers from the carriers onto the upper run of the conveyor. A fixed dividing bar 112 is provided to prevent excessive rolling of the containers as they are discharged from their associated carriers. The U-shaped guide 111 and the dividing bar 112 are secured as by welding the plates 91 and 92.

The empty carriers 30 and 37 then move downwardly into position to receive rows of containers from the feed mechanism 85. The feed mechanism 85 includes the lower run 107b of the transverse conveyor 107 which is arranged to receive a row of containers at a point outside of the superstructure 40 and move it into position between the bowed portions of the conveyors 22 and 23 for subsequent transverse displacement from the lower run 107b of the conveyor 107 either into a carrier 30 of conveyor 22 or into a carrier 37 of conveyor 23. The lower run of the conveyor 107b is supported by a guide plate 114 having downwardly deflected wings 116 and 117 which bridge the gap between the lower run of the conveyor 107 and the associated carriers 30 and 37, respectively.

Each row of containers brought into zone B on the lower run 107b is positioned between guide rails 121 and 122 of a push-off mechanism 123. The guide rails 121 and 122 are secured on the lower ends of a plurality of V-shaped supports 124 (only one being shown) which have hubs 124A secured to a shaft 126 that is journalled in the plates 91 and 92. A stop bar 121a and 122a is secured to the inlet end of each of the rails 121 and 122, respectively, and project transversely outward of the rails to prevent entry of a subsequent row of containers while a row of containers is being pushed laterally by one of the rails 121 or 122. The rails 121 and 122 are disposed closely adjacent to the lower run of the conveyor 107 and are normally held in the positon shown in solid lines in FIG. 6 thereby guiding the containers into feeding position and preventing them from rolling laterally off the lower run of the conveyor 107.

After a carrier load of containers has been moved into feeding position, the shaft 126 is abruptly pivoted clockwise or counterclockwise to cause the rail 121 to move to its phantom line position permitting rail 122 to push the carrier load of containers into a carrier 30 as it moves downwardly past the wing 116 of the guide plate 114, or to cause the rail 121 to push a row of containers into a carrier 37. During this time, one of the stop bars 121a or 122a of the rails 121 and 122 is moved into position to prevent other containers from moving between the bowed portions of the conveyors. Immediately thereafter the shaft 126 returns to its normal position thereby returning the rails to the solid line position shown in FIG. 6, permitting a new charge of containers to enter the feeding position. After this carrier load of containers has moved into the feeding position, the shaft 126 is pivoted in the opposite direction causing the other rail to kick the carrier load of containers into a carrier on the other conveyor. Thus carrier loads of containers are deflected from the lower run of the transverse conveyor 107 alternately into carriers on the conveyors 22 and 23 to fill each carrier, in turn, as it moves downwardly past the wings 116 or 117.

Any suitable mechanism may be used to actuate the push-off mechanism 123 in timed relation with the movement of the conveyors 22 and 23. One such actuating mechanism 129 is shown in FIG. 6, and comprises a cam 131 keyed to one of the shafts 101 and having evenly spaced lobes 132 and depressions 133 formed on the periphery thereof. One end of a lever 134 is pivotally connected to the plate 92 by a bolt 136 and the other end of the lever is pivotally connected to an end of a link 137 by a pin 138. The other end of the link 137 is pivotally connected to an arm 139 on a hub 139A that is keyed to shaft 126 exteriorly of plate 92. A cam follower roller 141 is journalled on the lever 134 and is held against the periphery of the cam 131 by a spring 142 which is connected between the lever 134 and an ear 143 projecting from the plate 92.

It will be seen, therefore, that movement of the conveyor 22 causes rotation of the sprockets 100, which, in turn, causes rotation of the shaft 101 and the cam 131 keyed thereto. Rotation of the cam 131 causes the cam follower 141 to alternately move into engagement with the lobes 132 and depressions 133 which are so positioned as to cause actuation of the kick-off mechanism 123 in the proper direction and at the proper time to displace a row of containers into the carriers 37 or 30 as they move downwardly past the wings 117 or 116. When the cam follower 141 is rolling along portions of the cam between the lobes 132 and depressions 133, the kick-off mechanism 123 is held in a centered position so that a row of containers may be moved between the rails 121 and 122.

The second embodiment of the double chain conveying system 16 shown in FIGS. 7 and 8 is identical to the above described system except that a wide conveyor 154 and a narrow conveyor 155 are provided which have carriers 156 and 157, respectively, that feature curved, one-piece container supporting bodies 158. Accordingly, parts in the embodiment of FIGS. 7 and 8 which are identical to those of the embodiment of FIGS. 1–6 will not be described in detail but will be assigned the same numerals as used in FIGS. 1–6.

Each of the carriers 156 and 157 includes the body 158 which is shaped to define a semi-cylindrical pocket 159 with a rolled container-retaining bead 161 on the inner edge thereof. End plates 162 are secured, as by welding, to each end of each carrier body 158, and each end plate 162 has a U-shaped bracket 163 welded thereto. The brackets 163 of the carriers 157 are bolted directly to horizontally aligned links 29 of the roller chains 24 and 25, whereas the U-shaped brackets 163 of the carriers 156 are bolted to extensions 164 which are connected by capscrews 166 to aligned links 36 of the roller chains 32 and 33.

The carriers 156 and 157 are moved through the several chambers of the hydrostatic cooker 15 in the same manner as the previously described carriers 37 and 30, and rows of containers are fed into and discharged from the carriers 156 and 157 by the same mechanism used with the carriers 37 and 30. It will be noted that the carriers 156 and 157 rely on an adjacent carrier of the same conveyor and on a bead of a carrier on the other conveyor in order to retain containers within their semi-cylindrical pockets 159.

A third embodiment of the conveying system of the present invention is shown in FIGS. 9 and 10 and is adapted to handle containers, which may either be cylindrical or rectangular in shape, while they are positioned on end rather than on their sides. Since containers are usually longer than they are wide, the present embodiment includes a wide conveyor 168 having carriers 169 and a narrow conveyor 170 having carriers 171 which are connected to alternate links of their supporting roller chains rather than on every link of the chain as was the case with the previously described embodiments of the invention. Each carrier comprises a pair of substantially identical, elongated, oppositely disposed, container-supporting members 177 and 178, and each member 177 and 178 has a container constraining skirt 179 on its outer end and a container abutment flange 181 on its inner end. End plates 182 are welded between the container supporting members 177 and 178 near each end thereof and have U-shaped brackets 183 welded thereto. The brackets 183 of the carriers 171 are bolted directly to aligned links 184 of supporting chains 174, while the brackets 183 of the carriers 169 are bolted to extensions 185, which extensions are connected by capscrews 186 to aligned links 187 of chains 172.

The wide conveyor 168 and the narrow conveyor 170 are guided through the several chambers of the hydrostatic cooker 15 in a manner identical to that already described in connection with the other embodiments of the invention. Likewise, the containers are discharged from their carriers 169 and 171 by gravity in a manner identical to that already described, and the rows of containers on end are fed into the carriers in a manner identical to that already described. It will be noted, however, that since the carriers 169 and 171 are mounted on every other link of their supporting chains, rather than on every link as was the case in the other two embodiments of the invention, the spacing of the lobes 132 and depressions 133 (FIG. 6) of the cam 131 must be spaced twice as far apart as that shown in FIG. 6.

From the foregoing description it will be apparent that the conveying system of the present invention utilizes a pair of cooperating conveyors having carriers thereon which are capable of retaining containers as they are caried along a tortuous path without the aid of external gates, guide bars and the like. Further, these carriers are arranged to receive and discharge flat articles as well as round articles, due to the fact that the carriers are devoid of constraining abutments which would interfere with the smooth entry and discharge of articles therefrom.

While several embodiments of the present invention have been shown and described, it will be understood that various changes and modifications may be made therein without departing from the spirit of the invention or the scope of the appended claims.

Having thus described the present invention, what is claimed as new and desired to be protected by Letters Patent is:

1. A conveying system comprising a first conveyor, a plurality of first carriers on said conveyor having openings therein for receiving and discharging articles, a second conveyor, a plurality of second carriers on said second conveyor having openings therein for receiving and discharging articles, means for driving said conveyors at the same speed and in the same direction, and guide means having a major portion and a minor portion for guiding said conveyors along predetermined paths, the major portion of said guide means being arranged to hold said conveyors together with the openings of said carriers on said first conveyor facing the openings of the carriers on said second conveyor, the minor portion of said guide means being arranged to cause said conveyors to bow outwardly from each other to permit feeding of articles into said carriers and discharge of articles out of said carriers.

2. A conveying system comprising a first conveyor, a plurality of first carriers on said conveyor having openings therein for receiving and discharging articles, a second conveyor, a plurality of second carriers on said second conveyor having openings therein for receiving and discharging articles, means for driving said conveyors at the same speed and in the same direction, and guide means having a major portion and a minor portion for guiding said conveyors along predetermined paths, the major portion of said guide means being arranged to hold said conveyors together with the openings of said carriers on said first conveyor facing the openings of the carriers on said second conveyor, the minor portion of said guide means being arranged to cause said conveyors to move outwardly away from each other, feed means disposed between said conveyors adjacent the minor portions of said guide means for feeding articles into the carriers as they move therepast, and discharge means disposed between said spaced portions of said conveyors for receiving articles from said carriers for subsequent discharge from said conveying system.

3. A conveying system comprising a first conveyor, a plurality of first carriers on said conveyor having openings therein for receiving and discharging articles, a second conveyor, a plurality of second carriers on said second conveyor having openings therein for receiving and discharging articles, means for driving said conveyors at the same speed and in the same direction, and guide means having a major portion and a minor portion for guiding said conveyors along predetermined paths, the major portion of said guide means being arranged to hold said conveyors together with the openings of said carriers on said first conveyor facing the openings of the carriers on said second conveyor, the minor portion of said guide means being arranged to cause said conveyors to bow outwardly from each other, a third driven conveyor extending through said bowed portion and having a discharge run for receiving articles from said carriers and a feed run having articles thereon for moving the articles into a feed position relative to said carriers, means cooperating with said discharge run for guiding articles discharged from said conveyors onto said discharge run, and pusher means timed with the movement of said first and second conveyors for pushing articles from said feed run alternately into carriers on said first and said second conveyors.

4. A conveying system comprising a drive shaft rotatable in a predetermined direction, two pairs of drive sprockets rigidly secured to the drive shaft, a first endless conveyor trained around one pair of said sprockets, a second endless conveyor trained around the other pair of said sprockets, a plurality of carriers on each conveyor, each carrier having an opening facing the carriers on the other conveyor for receiving or discharging an article therethrough, and guide means cooperating with said pairs of sprockets and with said conveyors for guiding each of said conveyors along predetermined paths, said guide means having portions for holding the carriers on said two conveyors immediately adjacent each other for retaining the articles within said carriers and having other portions for bowing the carriers on one conveyor away from the carriers on the other conveyor to permit feeding and discharging of articles from said carriers.

5. A conveying system comprising a drive shaft rotatable in a predetermined direction, two pairs of drive sprockets rigidly connected to said drive shaft, a first endless conveyor trained around one pair of said sprockets, a first guide means cooperating with said first pair of sprockets for guiding said first conveyor along a first predetermined path, a second endless conveyor trained around the other pair of sprockets, second guide means for guiding said second conveyor along a second predetermined path, said first and second paths having a major portion wherein the paths are coincident, and a plurality of generally U-shaped carriers mounted on each conveyor with all the carriers having their open ends facing the carriers on the other conveyor whereby the carriers on one of said conveyors cooperate with the carriers on the other conveyor to maintain articles in each carrier while the carriers are in said major portion of said paths.

6. A conveying system comprising a drive shaft rotatable in a predetermined direction, two pairs of drive sprockets rigidly connected to said drive shaft, a first endless conveyor trained around one pair of said sprockets, first guide means cooperating with said first pair of sprockets for guiding said first conveyor along a first predetermined path, a second endless conveyor trained around the other pair of sprockets, second guide means for guiding said second conveyor along a second predetermined path, said first and second paths having a major portion wherein the paths are coincident, and a plurality of carriers mounted on each conveyor, each carrier having a pair of spaced legs defining an article receiving and discharging opening therebetween, the terminal ends of said legs of said carriers on one of said conveyors being positioned intermediate the legs of adjacent carriers on the other conveyor so as to partially close the opening in said carriers on said other conveyor thereby retaining articles within said carriers while the carriers are in said major portion of said paths.

7. A conveying system compising a drive shaft rotatable in a predetermined direction, two pairs of drive sprockets rigidly connected to said drive shaft, a first endless conveyor trained around one pair of said sprockets, first guide means cooperating with said first pair of sprockets for guiding said first conveyor along a first predetermined path, a second endless conveyor trained around the other pair of sprockets, second guide means for guiding said second conveyor along a second predetermined path, said first and second paths having a major portion wherein said paths are coincident, and a plurality of evenly spaced, elongated carriers mounted on each conveyor with all the carriers having article receiving and discharging openings facing the carriers on the other conveyor, each carrier having a pair of spaced legs defining said opening through which a row of spaced articles may pass, the legs of said carriers on one of said conveyors being positioned adjacent to and opposite the openings in associated ones of the carriers on the other conveyor thereby partially closing said openings to retain the rows of articles within said carriers while said carriers are in said coincident portion of said paths.

8. A conveying system comprising a drive shaft rotatable in a predetermined direction, two pairs of drive sprockets rigidly secured to said drive shaft, each sprocket having a plurality of teeth, the teeth of the sprockets of one of said pairs of sprockets lying in radial planes which bisect the angle formed between the radial planes of two adjacent teeth of the sprockets of the other pair of sprockets, a first pair of endless chains trained around said first pair of sprockets, a second pair of endless chains trained around said second pair of sprockets, first guide means for guiding said first pair of chains along a first predetermined path, second guide means for guiding said second pair of chains along a second predetermined path, said first and said second paths having a major portion wherein said paths coincide and having a minor portion wherein said paths bow away from each other thereby causing said paths to separate, and a plurality of U-shaped carriers secured to each pair of chains and having oppositely facing article-receiving and discharging openings, the openings of the carriers on said first pair of chains facing and being out of phase with the openings of the carriers on said second pair of chains and disposed closely adjacent thereto when said carriers are moving along said major portions of said paths.

9. A conveying system comprising a drive shaft rotatable in a predetermined direction, two pairs of drive sprockets rigidly secured to said drive shaft each sprocket having a plurality of teeth, the teeth of the sprockets of one of said pairs of sprockets lying in radial planes which bisect the angle formed between the radial planes of two adjacent teeth of the sprockets of the other pair of sprockets, a first pair of endless chains trained around said first pair of sprockets, a second pair of endless chains trained around said second pair of sprockets, first guide means for guiding said first pair of chains along a first predetermined path, second guide means for guiding said second pair of chains along a second predetermined path, said first and second paths having a major portion wherein said paths coincide and having a minor portion wherein said paths bow away from each other thereby causing said paths to separate, a plurality of U-shaped carriers secured to each pair of chains and having open side openings, the openings of the carriers on said first pair of chains facing and being out of phase with the openings of carriers on said second pair of chains and being disposed closely adjacent thereto when said carriers are moving along said major portions of said paths, and means for adjusting the position of said first pair of chains relative to the position of said second pair of chains.

10. A conveying system comprising a drive shaft rotatable in a predetermined direction, two pairs of drive sprockets rigidly secured to said drive shaft, each sprocket having a plurality of teeth, the teeth of the sprockets of one of said pairs of sprockets lying in radial planes which bisect the angle formed between the radial planes of two adjacent teeth of the sprockets of the other pair of sprockets, a first pair of endless chains trained around said first pair of sprockets, a second pair of endless chains trained around said second pair of sprockets, first guide means for guiding said first pair of chains along a first predetermined path, second guide means for guiding said second pair of chains along a second predetermined path, said first and second paths having a major portion wherein said paths coincide and having a minor portion wherein said paths bow away from each other thereby causing said paths to separate, a plurality of carriers secured to each set of chains, and a pair of spaced legs having terminal ends on each carrier and defining an article receiving and discharging opening therebetween, said terminal ends of one of the legs of the carriers on one of said pair of chains being positioned intermediate the legs of adjacent carriers on the other pair of chains so as to partially close the openings in the associated carriers on the other pair of chains while the carriers are in said major portions of said paths thereby constraining articles within said carriers.

11. A conveying system comprising a drive shaft rotatable in a predetermined direction, two pairs of drive sprockets rigidly secured to said drive shaft, each sprocket having a plurality of teeth, the teeth of the sprockets of one of said pair of sprockets lying in radial planes which bisect the angle formed between the radial planes of two adjacent teeth of the sprockets of the other pair of sprockets, a first pair of endless chains trained around said first pair of sprockets, a second pair of endless chains trained around said second pair of sprockets, first guide means for guiding said first pair of chains along a first predetermined path, second guide means for guiding said second pair of chains along a second predetermined path, said first and second predetermined paths having a major portion wherein said paths coincide and having a minor portion wherein said paths bow away from each other thereby causing said paths to separate, a plurality of carriers secured to each set of chains, a pair of spaced legs having terminal ends on each carrier and defining an article receiving and discharging opening therebetween, said terminal ends of one of said legs of the carriers on one of said pair of chains being positioned intermediate the legs of adjacent carriers on the other pair of chains so as to partially close the openings in the associated carriers on the other pair of chains while the carriers are in said major portion of said paths thereby retaining articles within said carriers, and means for adjusting the position of said first pair of chains relative to the position of said second pair of chains.

12. A conveying system comprising a drive shaft rotatable in a predetermined direction, two pairs of drive sprockets rigidly secured to said drive shaft, a first endless conveyor trained around one pair of said sprockets, a second endless conveyor trained around the other pair of said sprockets, a plurality of carriers on each conveyor, each carrier having an opening facing the carriers on the other conveyor for receiving or discharging an article, and guide means cooperating with said pairs of sprockets and with said conveyors for guiding each of said conveyors along predetermined paths, said guide means having portions for holding the carriers on said two conveyors adjacent each other for retaining the articles within said carriers and having other portions for bowing the carriers on one conveyor away from the carriers on the other conveyor, feed conveying means disposed within said bowed portion for moving articles between said carriers, means timed with the movement of said first and second conveyors for moving articles transversely of said feed conveying means alternately into the carriers on said first and second conveyors, and discharge conveying means disposed within said bowed portion in position to receive articles which gravitate from said carriers and to remove the articles from within said bowed portion.

13. A conveying system comprising a pair of endless support members, a plurality of carriers secured to each endless support member, each carrier including an article receptacle having an opening at one side defined by the ends of two spaced legs, means mounting said endless support members for movement along a first portion of an endless path with a particular carrier of one support member disposed adjacent a cooperating carrier on the other support member and with a leg of said cooperating carrier extending to a point adjacent to the space between the legs of said particular carrier to retain an article in said particular carrier, and means mounting said endless support members for movement along a second portion of said endless path wherein the leg of said cooperating carrier is spaced from the opening in said particular carrier to permit the discharge of an article therefrom.

14. A conveying system comprising two endless support members, a plurality of article carriers on each support member, each carrier on each of said support members having a discharge opening and an article retaining member adapted to prevent movement of articles from the discharge opening of a carrier on the other support member, and means for moving said carriers along adjacent paths with the article retaining member of each carrier being in article-retaining position relative to the associated discharge opening for a predetermined portion of the path of travel of the carriers and removed from said article-retaining position for another predetermined portion of the path of travel of the carriers to permit the discharge of an article from the associated carrier.

15. A conveying system comprising a first conveyor, a second conveyor, said conveyors having carriers mounted thereon for receiving and discharging articles, first means for retaining said first and second conveyors in close proximity to each other so that a carrier of each conveyor will retain the articles within the carrier of the other conveyor, second means for separating said first and second conveyors so that the carriers may discharge and receive articles and drive means connected to said conveyors for movement of said conveyors at the same speed and in the same direction.

16. A conveying system as defined in claim 15 wherein discharge and feeding means are provided between the conveyors when separated.

17. A conveying system as defined in claim 16 wherein the discharge means comprises an inverted V-shaped deflector plate and the top run of a third conveyor moving between said first and second conveyors when separated and said feeding means comprises an oscillating pusher means and the bottom run of said third conveyor.

18. A conveying system comprising a rotatable drive shaft, an inner and outer pair of drive sprockets rigidly secured to the drive shaft, a first endless conveyor trained around said inner sprockets, a second endless conveyor trained around said outer sprockets, said first and second conveyors traveling the same distance at the same speed around said sprockets, and guide means cooperating with said conveyors for guiding each of said conveyors along predetermined paths, said guide means separating said conveyors for part of said predetermined path and retaining said conveyors adjacent each other for the remainder of said path.

References Cited by the Examiner
UNITED STATES PATENTS

| | | | |
|---|---|---|---|
| 688,820 | 12/01 | Bancroft | 99—360 |
| 896,251 | 8/08 | Sappenfield | 198—131 X |
| 1,098,551 | 6/14 | Beckman | 99—360 |
| 1,389,447 | 8/21 | Johnson | 99—361 |
| 2,223,060 | 11/40 | Dostal | 198—131 |
| 2,243,879 | 6/41 | Meyer | 198—131 |
| 2,772,005 | 11/56 | Dubin et al. | 198—131 X |
| 2,968,232 | 1/61 | Carvallo | 99—360 |

ROBERT B. REEVES, *Acting Primary Examiner.*

WILLIAM B. LA BORDE, *Examiner.*